United States Patent
Piazza et al.

(10) Patent No.: US 9,649,927 B2
(45) Date of Patent: May 16, 2017

(54) HYBRID POWERTRAIN UNIT FOR MOTOR VEHICLES WITH A VARIABLE TRANSMISSION DEVICE BETWEEN THE ELECTRIC MACHINE AND THE DIFFERENTIAL

(71) Applicant: C.R.F. Societa Consortile per Azioni, Orbassano (IT)

(72) Inventors: Andrea Piazza, Orbassano (IT); Marco Garabello, Orbassano (IT); Gianluigi Pregnolato, Orbassano (IT); Fabio Pesola, Orbassano (IT)

(73) Assignee: C.R.F. Societa Consortile per Azioni, Orbassano (Turin) (IT)

( * ) Notice: Subject to any disclaimer, the term of this patent is extended or adjusted under 35 U.S.C. 154(b) by 48 days.

(21) Appl. No.: 14/800,137

(22) Filed: Jul. 15, 2015

(65) Prior Publication Data
US 2016/0031309 A1    Feb. 4, 2016

(30) Foreign Application Priority Data

Jul. 29, 2014 (EP) .................................. 14178949

(51) Int. Cl.
*B60K 6/387* (2007.10)
*B60K 6/48* (2007.10)
(Continued)

(52) U.S. Cl.
CPC .............. *B60K 6/50* (2013.01); *B60K 6/387* (2013.01); *B60K 6/48* (2013.01); *B60K 6/547* (2013.01);
(Continued)

(58) Field of Classification Search
CPC .......... B60K 6/387; B60K 6/48; B60K 6/547; B60K 2006/4808; B60K 2006/4841; F16H 3/002; F16H 37/0826
See application file for complete search history.

(56) References Cited

U.S. PATENT DOCUMENTS 6,719,654 B2 * 4/2004 Deichl ..................... B60K 6/40
                                                            180/65.25
6,976,934 B2 * 12/2005 Komeda .................. B60K 6/48
                                                            180/65.25
(Continued)

FOREIGN PATENT DOCUMENTS

DE    102009056366    6/2011
DE    102012220970    5/2014
(Continued)

OTHER PUBLICATIONS

Search Report for European Patent Application No. 14178949.5 mailed Jan. 7, 2015, 3 pages.

*Primary Examiner* — Justin Holmes
*Assistant Examiner* — David Morris
(74) *Attorney, Agent, or Firm* — Remarck Law Group PLC

(57) ABSTRACT

A hybrid powertrain unit comprises an engine and a gearbox device with a primary shaft connectable to a shaft of the engine via a clutch device. The gearbox device comprises a secondary shaft with an output pinion meshing with a first crown wheel of a differential, the casing of which is rigidly connected to a casing of the gearbox device. The unit comprises an electric machine configured to operate as an electric motor and as an electric generator, and having a shaft connected by a transmission to a second crown wheel of the differential. In the transmission, arranged between the electric machine shaft and the second crown wheel is an engagement device that can be operated via an electronically controlled actuator. The transmission that connects the electric machine shaft to said second crown wheel includes an auxiliary shift device configured for providing at least two different selectable transmission ratios.

10 Claims, 6 Drawing Sheets

(51) Int. Cl.
*B60K 6/50* (2007.10)
*B60K 6/547* (2007.10)
*B60K 25/00* (2006.01)
*B60K 25/02* (2006.01)

(52) U.S. Cl.
CPC ............ *B60K 2006/4808* (2013.01); *B60K 2006/4841* (2013.01); *B60K 2025/005* (2013.01); *B60K 2025/022* (2013.01); *Y02T 10/626* (2013.01); *Y02T 10/6221* (2013.01); *Y10S 903/951* (2013.01)

(56) References Cited

U.S. PATENT DOCUMENTS

| | | | | |
|---|---|---|---|---|
| 8,926,464 | B2 * | 1/2015 | Garabello | B60K 6/387 475/5 |
| 2002/0061803 | A1 * | 5/2002 | Aoki | B60K 6/44 477/3 |
| 2002/0065163 | A1 | 5/2002 | Deichl et al. | |
| 2011/0239819 | A1 * | 10/2011 | Shibahata | B60K 6/383 74/665 A |
| 2015/0360554 | A1 * | 12/2015 | Piazza | B60K 6/445 475/5 |
| 2015/0360555 | A1 * | 12/2015 | Piazza | B60K 6/445 475/5 |
| 2015/0360556 | A1 * | 12/2015 | Piazza | B60K 6/445 475/5 |
| 2015/0360557 | A1 * | 12/2015 | Piazza | B60K 6/387 475/5 |

FOREIGN PATENT DOCUMENTS

| | | |
|---|---|---|
| EP | 1529957 | 5/2005 |
| EP | 1868832 | 12/2007 |
| EP | 2727757 | 5/2014 |
| WO | 2005095141 | 10/2005 |
| WO | 2013007886 | 1/2013 |

* cited by examiner

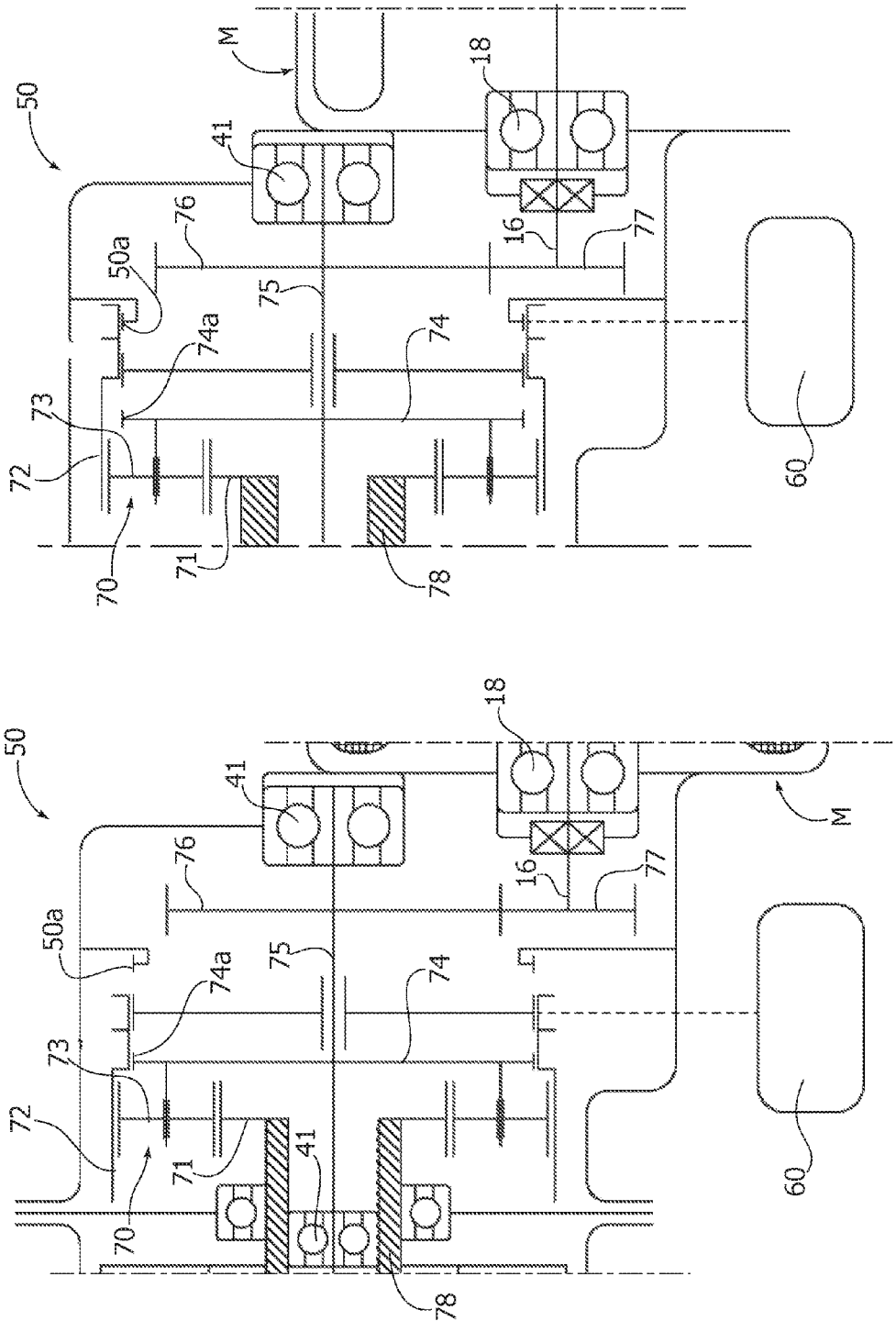
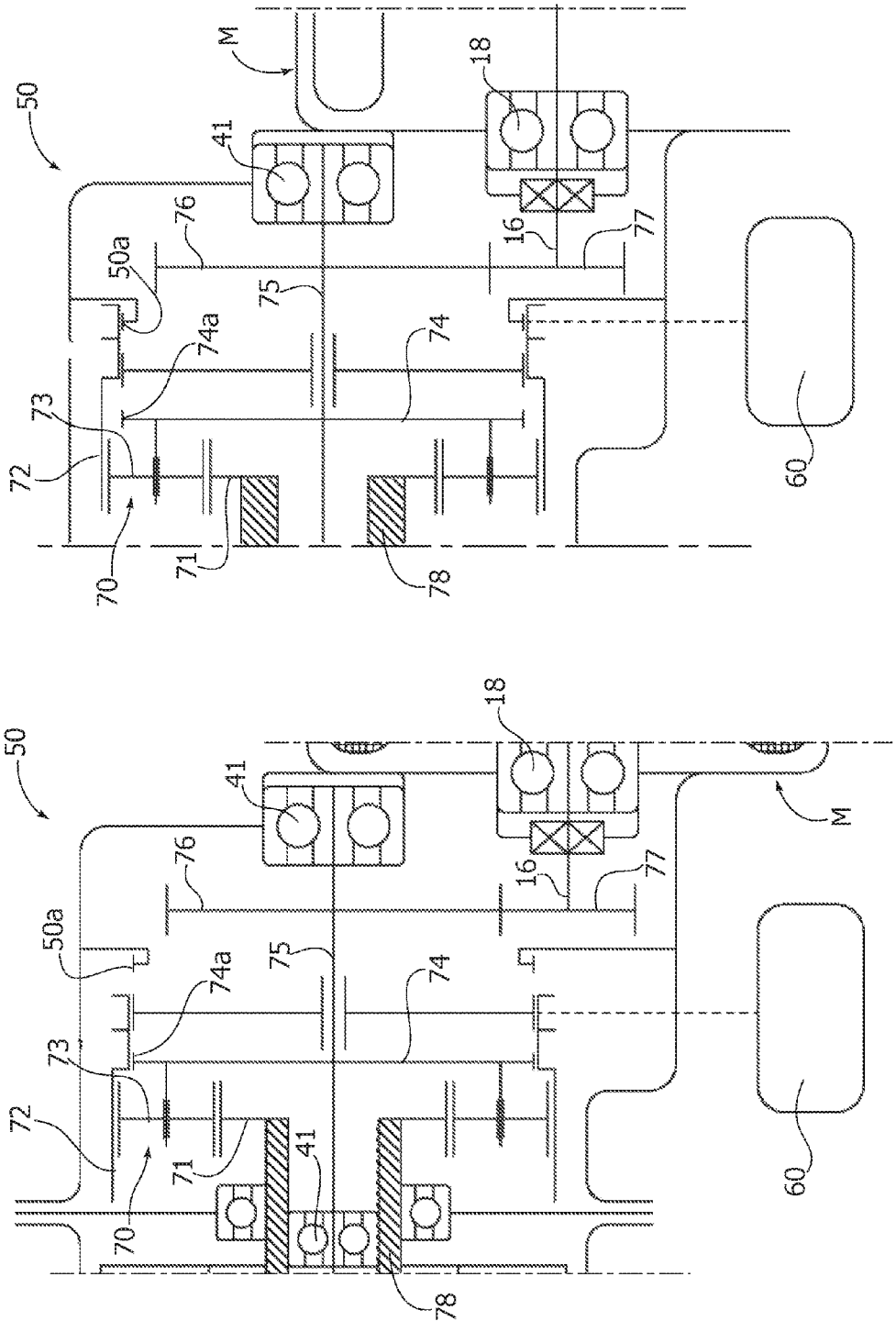

HYBRID POWERTRAIN UNIT FOR MOTOR VEHICLES WITH A VARIABLE TRANSMISSION DEVICE BETWEEN THE ELECTRIC MACHINE AND THE DIFFERENTIAL

CROSS REFERENCE TO RELATED APPLICATIONS

This application claims priority to European Patent Application No. 14178949.5 filed on Jul. 29, 2014, the entire disclosure of which is incorporated herein by reference.

FIELD OF THE INVENTION

The present invention relates to a hybrid powertrain unit for motor vehicles, of the type comprising:
an internal-combustion engine; and
a gearbox device including:
at least one primary shaft that can be connected to the crankshaft of the motor vehicle by means of a clutch device;
at least one secondary shaft, the axis of which is parallel to, and spaced apart from, the axis of said primary shaft, and which carries an output pinion;
a plurality of pairs of gears corresponding to a plurality of forward gear ratios, in which the gears of each pair are rigidly connected in rotation with respect to one between said primary shaft and said secondary shaft, and the other is freely rotatable with respect to the other of said primary and secondary shafts; and
a plurality of gear-selection devices for coupling in rotation each of said freely rotatable gears with the shaft on which it is mounted,
said unit further comprising:
a differential, having a first crown wheel meshing with said output pinion of said secondary shaft of the gearbox device; and
an electric machine adapted to operate both as electric motor and as electric generator, and having a casing rigidly connected to a supporting structure of said powertrain unit, and a shaft connected by means of a transmission to a second crown wheel of said differential.

A hybrid powertrain unit of the type referred to above is known, for example, from EP 1 868 832 B1. DE 10 2009 056366 A1 and US 2002/065163 A1 also disclose a hybrid powertrain unit of the type referred to above, which also comprises an engagement device arranged, in the connecting transmission, between the shaft of the electric machine and the aforesaid second crown wheel of the differential, and means for actuating the aforesaid engagement device.

It should likewise be noted that in European patent application EP 13153802 (already filed, but not yet published at the date of priority of the present invention), the present applicant has proposed a powertrain unit of the type referred to above, with the engagement device arranged between the shaft of the electric machine and the second crown wheel of the differential.

OBJECT OF THE INVENTION

The object of the present invention is to provide a hybrid powertrain unit that will have a simple structure and small overall dimensions and that will be efficient, reliable, and versatile in operation.

With a view to achieving the above purpose, the subject of the invention is a hybrid powertrain unit having the features of claim 1.

In the preferred embodiment, said auxiliary shift device is set between said engagement device and the shaft of the electric machine.

According to a further characteristic of the invention, the auxiliary shift device is provided with an electronically controlled actuator for selection of the transmission ratio.

In a preferred embodiment, the engagement device between the electric machine and the differential is a clutch engagement device, and the actuator means associated thereto comprise an electromagnetic or electrohydraulic actuator and an electronic unit for controlling the actuator.

Activation of the engagement device is controlled by the electronic control unit of the motor vehicle according to a pre-set program, as a function of the operating parameters of the engine and of the motor vehicle. The same applies to the selection device associated to the aforesaid auxiliary shift device.

According to further preferred characteristics, the powertrain unit according to the invention may present one or more of a series of additional characteristics:

the electric machine can have its shaft connected to the shaft of the internal-combustion engine at the end of this opposite to the one connected to the main gearbox device, for example by means of a belt transmission, for instance, also including an engagement device;

the belt transmission can drive also one or more auxiliary devices of the motor vehicle, such as, for example, the compressor of the air-conditioning system of the vehicle and a source of negative pressure for the braking system.

The above additional characteristics, taken in themselves, have already been proposed by the present applicant in European applications Nos. EP 13153802, EP 14172677, EP 14172693, EP 14172707, and EP 14172710, all of which are still secret at the date of priority of the present invention.

BRIEF DESCRIPTION OF THE FIGURES

Further characteristics and advantages of the invention will emerge from the ensuing description with reference to the annexed drawings, which are provided purely by way of non-limiting example and in which:

FIGS. 6 and 7 illustrate at an enlarged scale a detail of FIG. 5, in two different operating conditions.

DETAILED DESCRIPTION OF THE INVENTION

Figure 1:
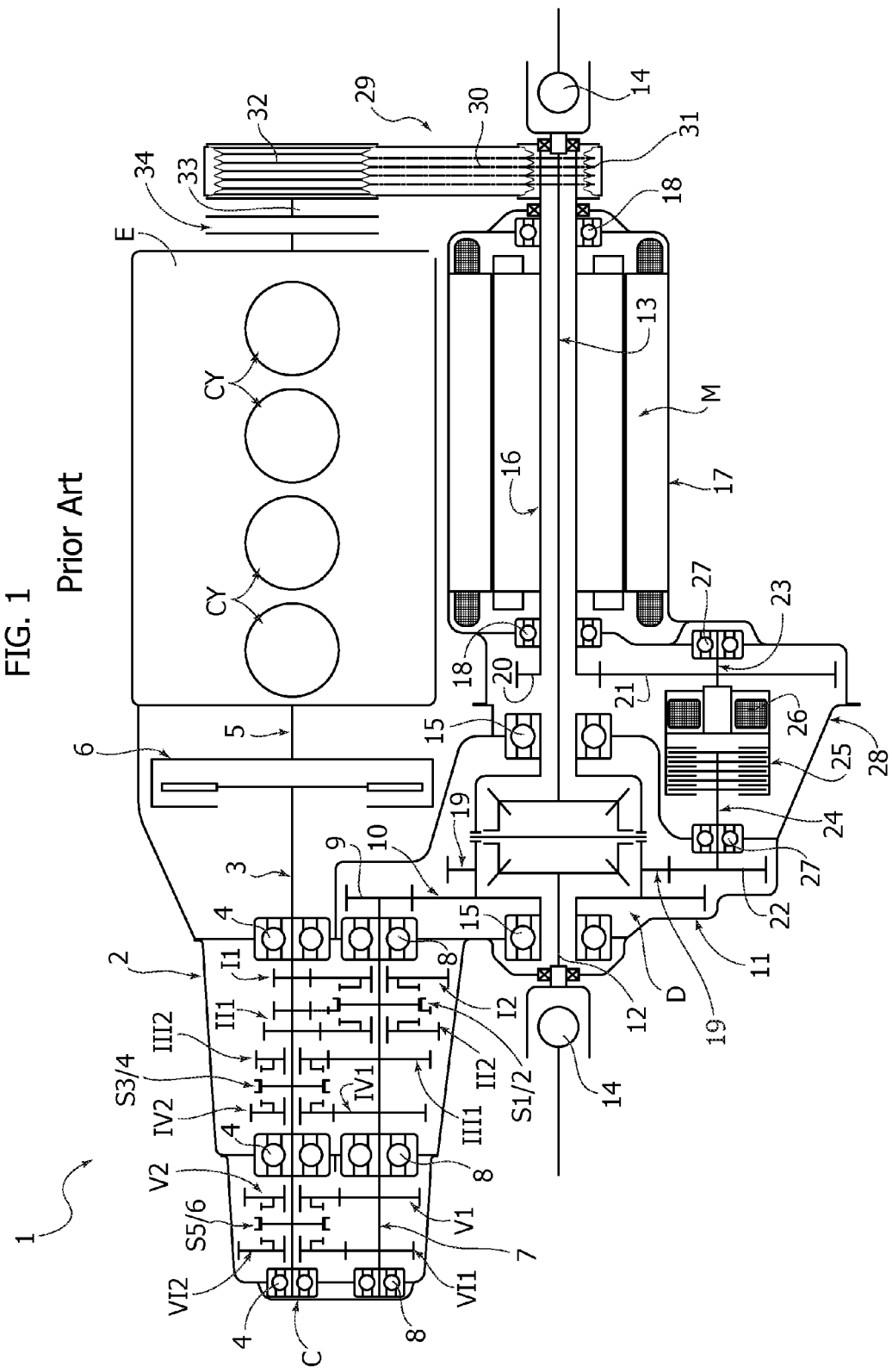
FIG. 1 is a schematic view of a first embodiment of a powertrain unit that has been already proposed by the present applicant in European patent application No. EP 13153802 (already filed, but not yet published at the date of priority of the present invention)

In FIGS. 1-7, parts in common are designated by the same reference numbers. In said figures, number 1 designates as a whole a hybrid powertrain unit for motor vehicles, comprising an internal-combustion engine E, a gearbox device C, a differential D, and an electric machine M.

According to the conventional art, the gearbox device C has a casing 2, rotatably mounted inside which is a primary shaft 3 by means of rolling bearings 4. The primary shaft can be connected to the shaft 5 of the engine E via a clutch device 6 of any known type. Moreover, rotatably mounted inside the casing 2 of the gearbox C, via rolling bearings 8, is a secondary shaft 7. The axis of the secondary shaft 7 is parallel to and arranged at a distance from the axis of the primary shaft 3.

Of course, even though the annexed drawings show a gearbox of the conventional type, which includes a single primary shaft and a single secondary shaft, the invention applies to any other known configuration of the gearbox device, including, in particular, the configurations that envisage two coaxial primary shafts that can be connected selectively to the crankshaft by means of a double-clutch device and have any number of secondary shafts.

To return to the configuration illustrated in the drawings by way of example, the primary shaft 3 and the secondary shaft 7 carry pairs of gears meshing together to provide a plurality of forward gear ratios. One gear of each pair is rigidly connected to the shaft by which it is carried, whereas the other gear of each pair is mounted freely rotatable on the respective shaft.

In the case of the example illustrated, the first gear ratio is obtained by a pair of gears including a gear I1 rigidly connected to the primary shaft 3 and a gear I2 mounted freely rotatable on the secondary shaft 7. The second gear ratio is obtained by means of a gear II1 rigidly connected to the primary shaft 3 and a gear II2 mounted freely rotatable on the secondary shaft 7. The third, fourth, fifth, and sixth gear ratios are obtained by means of pairs of gears including gears III1, IV1, V1, VI1 rigidly connected to the secondary shaft 7 and corresponding gears III2, IV2, V2 and VI2 mounted freely rotatable on the primary shaft 3.

Once again according to the known art, the primary and secondary shafts 3, 7 carry selection devices S1/2, S3/4 and S5/6 for connecting selectively in rotation each of the freely rotatable gears I2, II2, III2, IV2, V2, VI2 to the respective shafts on which they are carried.

The gearbox device C further comprises a third shaft (not visible in the plate of drawings), which carries in a freely rotatable way a reverse gear and a selection device for connecting said gear in rotation to the respective shaft in such a way as to transmit the motion of rotation of the primary shaft 3 to the secondary shaft 7 with a reversal of the direction of rotation.

The secondary shaft 7 carries an output pinion 9 meshing with a first crown wheel 10 of the differential D. The differential D, which has a structure of a type in itself known, has a casing 11 rigidly connected to the casing 2 of the gearbox device and has two output shafts 12, 13 for transmitting the motion to the gears of the motor vehicle via constant-velocity universal joints 14. The crown wheel 10 is rigidly connected to the gear-train carrier of the differential, which is rotatably mounted within the casing 11 by means of bearings 15.

The electric machine M is adapted to function both as electric motor and as electric generator, according to the operating conditions. In the embodiment illustrated in FIG. 1, the electric machine M shares the axes of the two output shafts 12, 13 of the differential D and is axially traversed by its shaft, designated by 16. The shaft 16 is hollow and is in turn axially traversed by the output shaft 13 of the differential D so as to enable aligned arrangement of the electric machine M with the differential D. The casing 17 of the electric machine M is rigidly connected to the casing 11 of the differential D and possibly also to the structure of the internal-combustion engine E. The shaft 16 of the electric machine M is rotatably supported within the casing 17 via rolling bearings 18.

The shaft 16 of the electric machine M is connected in rotation to a second crown wheel 19 of the differential D rigidly connected to the gear-train carrier of the differential. In the case of FIG. 1, the connection between the shaft 16 of the electric machine M and the crown wheel 19 of the differential D is obtained by a double gear-reduction jump, obtained by means of a first pair of gears 20, 21 and a second pair of gears 22, 19. The gear 20 is rigidly connected to the shaft 16 of the electric machine M, whereas the gears 21, 22 are carried by two shafts 23, 24 aligned with one another, which can be connected by means of an engagement device 25, which, in the case of the example illustrated, is a clutch device controlled by an electromagnetic actuator 26, which is in turn driven by an electronic control unit U (illustrated schematically only in FIG. 1). The actuator could also be of an electrohydraulic type, or of any other known type. Also the engagement device could be of any other known type. The two shafts 23, 24 are rotatably mounted via rolling bearings 27 within a casing 28 of the gear-reduction transmission, which is rigidly connected to the casing 11 of the differential D and with the casing 17 of the electric machine M.

With reference to the specific example illustrated, the engagement device 25 and the electromagnetic actuator 26 may be obtained in any known way. For these reasons, the constructional details of said elements are not illustrated herein, also in order to render the drawings simpler and of easier to understand.

Finally, designated as a whole by CY are the cylinders of the engine that are arranged vertically in the condition where the unit is mounted on the motor vehicle. Consequently, the views illustrated in FIGS. 1-4 are top plan views, with reference to the arrangement where the powertrain unit is mounted in the motor vehicle. Typically, the unit is mounted in the front part of the motor vehicle, in association with the front wheels of the motor vehicle.

The electric machine M functions as electric motor or as generator, according to the operating conditions of the engine and of the motor vehicle. In particular, the following different operating modes are possible:

electric drive (internal-combustion engine E turned off and gearbox in neutral);

hybrid drive (internal-combustion engine turned on and gearbox with a gear engaged); and recovery of energy during braking (internal-combustion engine turned on and gear in neutral or else clutch 6 between the internal-combustion engine and gearbox disengaged).

The electric machine M may moreover be used as electric motor for filling the gap in the torque supplied by the internal-combustion engine to the wheels of the vehicle during gear change.

Finally, the engagement device 25 enables decoupling of the electric machine M in the operating conditions in which intervention thereof is not required.

As already mentioned, FIG. 1 of the annexed drawings regards a solution already proposed by the present applicant in the European patent application No. EP 13153802 (already filed, but not yet published at the date of priority of the present invention). In this solution, there is provided a direct connection of the shaft 16 of the electric machine M to the shaft 5 of the internal-combustion engine E, at the end of the engine E opposite to the one connected to the gearbox device C. For this purpose, in the example illustrated, an auxiliary belt transmission 29 is provided, including an endless belt 30 engaged on a first pulley 31 carried by the shaft 16 of the electric machine M and on a second pulley 32 carried by the shaft 33 that can be connected to the shaft 5 of the internal-combustion engine via an engagement device 34, for example, an electromagnetically governed one or one of any other known type. An engagement device of this type is, for example, described and illustrated in the document No. EP 1 529 957 A1 filed in the name of the present applicant.

The belt transmission 29 and the engagement device 34 enable direct connection of the shaft of the internal-combustion engine to the shaft of the electric machine M to provide, for example, a function of the electric machine as BAS (Belt Alternator Starter), i.e., as a generator driven by the engine or as electric motor for starting the internal-combustion engine.

In the modality of starting of the internal-combustion engine, the engagement device 25 is disengaged and the engagement device 34 is engaged.

In the modality of generation of current with the vehicle standing still, the internal-combustion engine is turned on, the engagement device 25 is disengaged, and the engagement device 34 is engaged.

In vehicles equipped with a stop-and-go device, in which the internal-combustion engine turns off automatically when the vehicle is stationary, the electric machine M makes it possible to keep auxiliary devices governed by the belt 30 functioning (such as the compressor of the air-conditioning system). In this condition, the engagement device 34 is disengaged.

Figure 2:
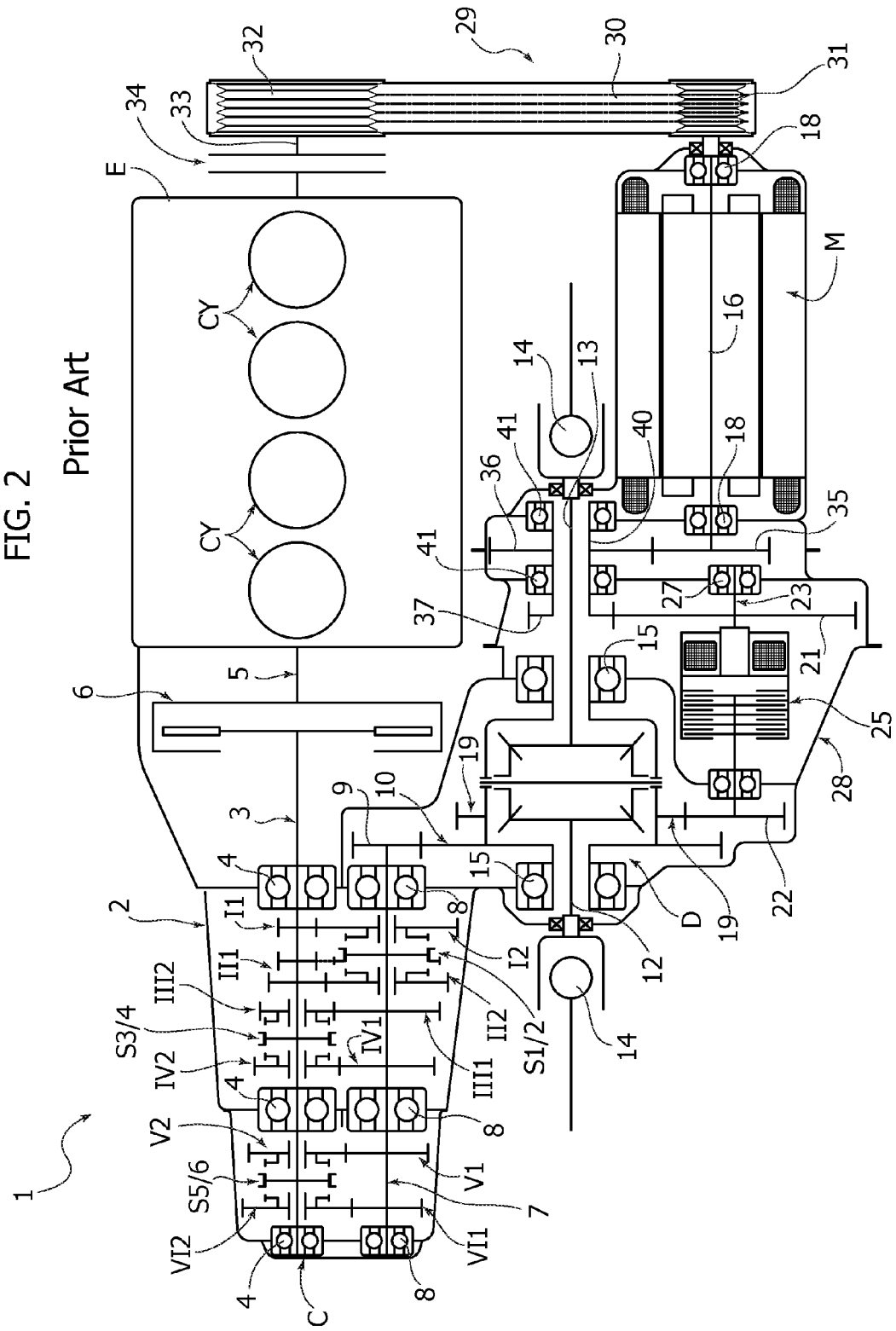
FIG. 2 is a schematic view of a variant of the powertrain unit of FIG. 1, likewise already proposed by the present applicant in European patent application No. EP 13153802.
Figure 3:
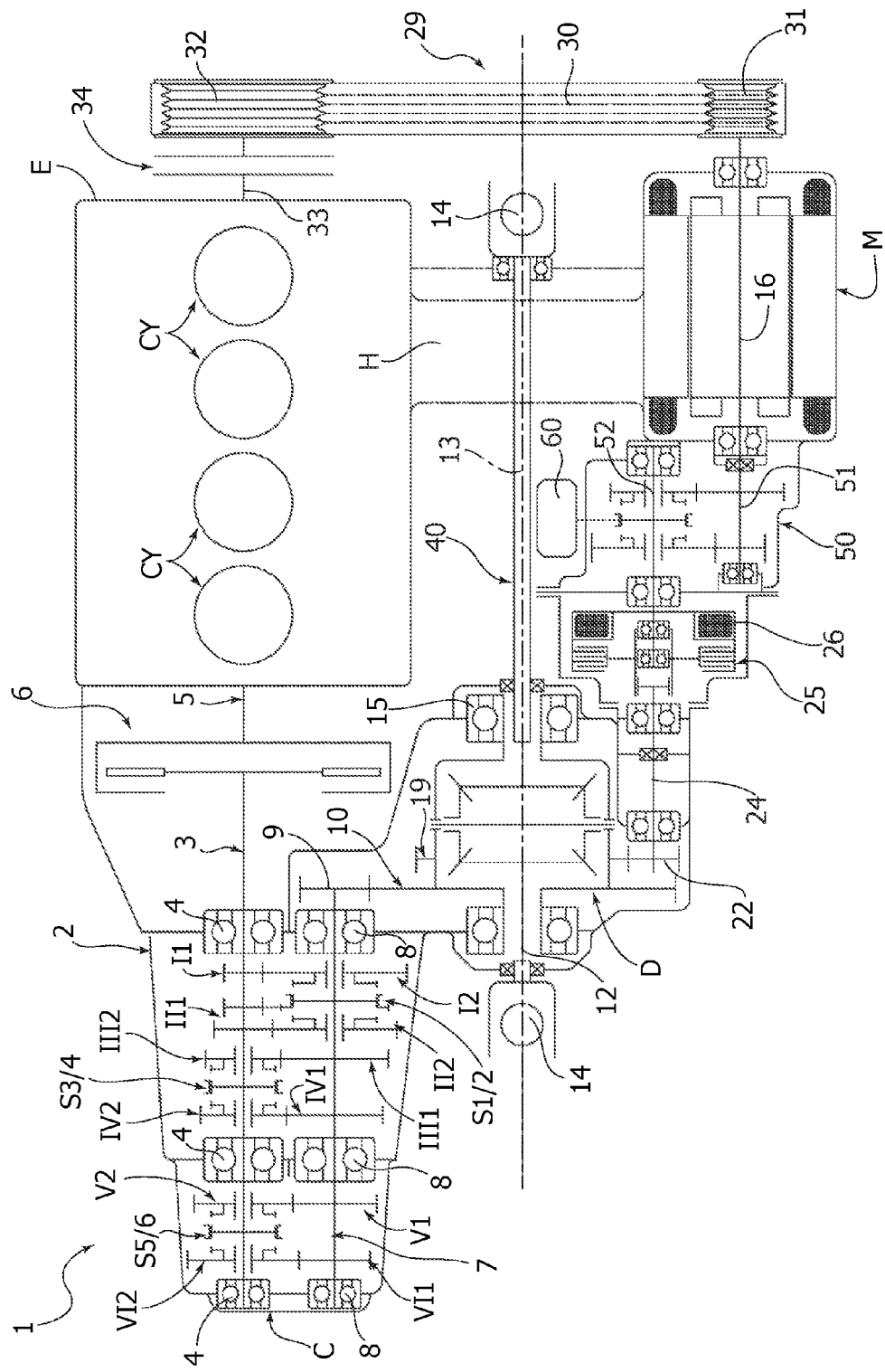
FIG. 3 is a schematic view of a first embodiment of the powertrain unit which does not form part of the invention.

FIG. 2 illustrates a variant, which has also already been proposed in the prior European patent application No. EP 13153802, that differs from the first embodiment of FIG. 1 in that the electric machine M has its axis arranged parallel to and at a distance from the axes of the output shafts 12, 13 of the differential D. In this case, the connection between the shaft 16 of the electric machine M and the second crown wheel 19 of the differential D is obtained by means of three gear-reduction jumps. A first jump is obtained by means of the pair of gears 35, 36. A second jump is obtained by means of the pair of gears 37, 21, and a third jump is obtained by means of the pair of gears 22, 19. The gears 36, 37 are carried by a hollow shaft 40 that is mounted freely rotatable within the casing 28 via rolling bearings 41. The hollow shaft 40 is traversed by the output shaft 13 of the differential D. In the embodiment of FIG. 3, the gears 21, 22 are arranged as described with reference to FIG. 1 in association with shafts 23, 24 that can be connected together by means of the electromagnetically governed engagement device 25.

Figure 4:
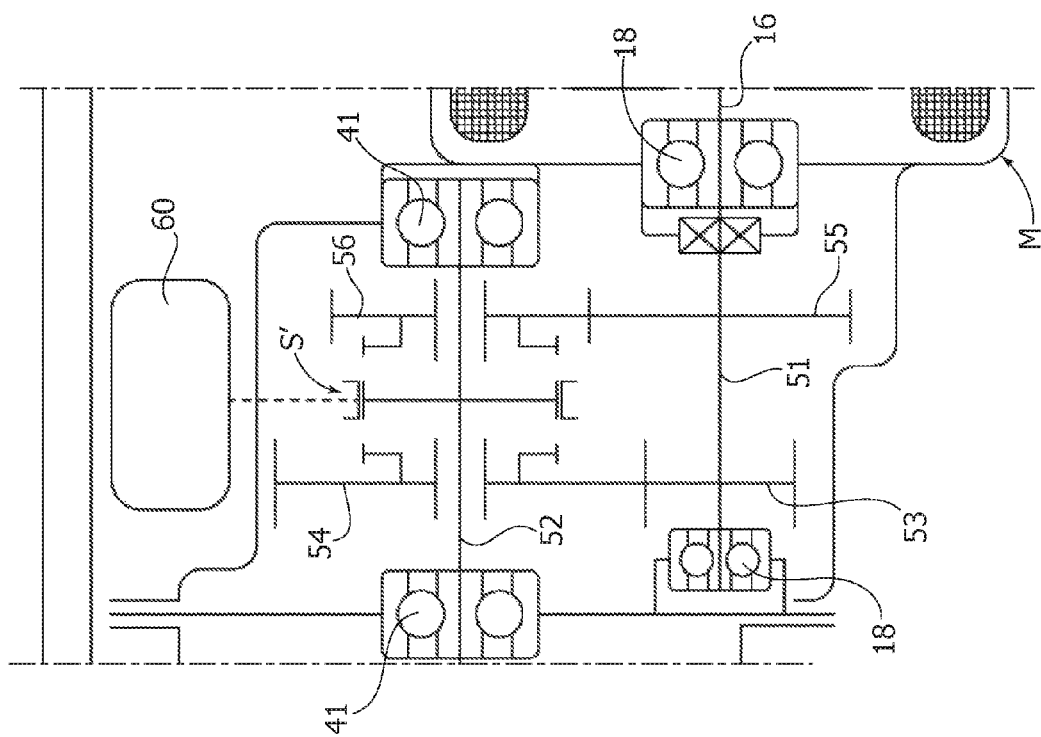
FIG. 4 shows a detail of FIG. 3 at an enlarged scale.

FIGS. 3 and 4 illustrate a first embodiment which does not form part of the invention. This solution has in common with the solutions of FIGS. 1 and 2 both provision of an engagement device 25 between the electric machine M and the differential D and provision of a connection, for example obtained by means of the belt transmission 29, between the shaft of the electric machine M and the shaft 5 of the internal-combustion engine E, on the side opposite to the gearbox device. However, provision of the transmission 29, in the case of the present invention, is to be understood only as a preferred, though not essential, feature. In other words, the transmission 29 could even be omitted.

The main difference with respect to the solutions of FIGS. 1 and 2 lies in the fact that, in the case of FIG. 3, the transmission that connects the shaft 16 of the electric machine M with the crown wheel 19 of the differential D includes an auxiliary shift device 50 designed to select two different transmission ratios.

In the examples illustrated herein, the auxiliary shift device is set between the engagement device 25 and the shaft 16 of the electric machine M. However, it would also be possible to provide the device 50 in the transmission between the engagement device 25 and the crown wheel 19 of the differential.

The device 50 has a casing 50A rigidly connected to the casing of the engagement device 25 on one side and to the casing of the electric machine on the opposite side. The casing of the engagement device 25 is in turn rigidly connected to the casing of the differential D.

In the example of FIGS. 3 and 4, the auxiliary shift device 50 comprises an auxiliary primary shaft 51 and an auxiliary secondary shaft 52. The shaft 51 is connected to the shaft 16 of the electric machine M and supported in rotation by means of rolling bearings 18. With reference in particular to FIG. 4, the shaft 52, the axis of which is parallel to and set at a distance from the axis of the shaft 51, is connected to said second crown wheel 19 of the differential D via the engagement device 25 and is supported in rotation by means of rolling bearings 41. The shafts 51, 52 carry two pairs of gears 53, 54 and 55, 56, corresponding to two different transmission ratios. The gears 53, 55 are rigidly connected in rotation to the shaft 51, whereas the other two gears 54, 56 are mounted in a freely rotatable way on the shaft 52.

A selection device S', illustrated only schematically in the drawings, which can be obtained in any way known in the field of selection devices for gearbox devices of motor vehicles (in a way similar to the selection devices S1/2, S3/4 and S5/6 of the gearbox device 2 described above), enables selection of two different transmission ratios, being axially displaceable between two operating positions in which it selectively couples the gear 54 or the gear 56 in rotation with the shaft 52.

Displacement of the selection device S' between its two operating positions is controlled by an actuator 60 of any known type, illustrated only schematically in the figures. Preferably, the actuator 60 is an electromechanical actuator electronically controlled by the control unit of the motor vehicle on the basis of a pre-set program, according to the operating conditions of the vehicle, of the engine E, and of the electric machine M.

If it is envisaged that the selection device S' can remain also in a neutral position, intermediate between its two operating positions, it could also perform the function of the engagement device 25, which hence could even be eliminated. However, maintaining the engagement device 25 is useful in so far as it gives the possibility of disengaging the drive much more rapidly and adapting the difference of r.p.m. between the input and the output better, performing in practice the function of a centralized synchronizer, at the same time providing the possibility of simplifying the selection device S' to a non-synchronized front engagement device. The same consideration applies to the embodiment according to the invention, which will be described hereinafter.

Figure 5:
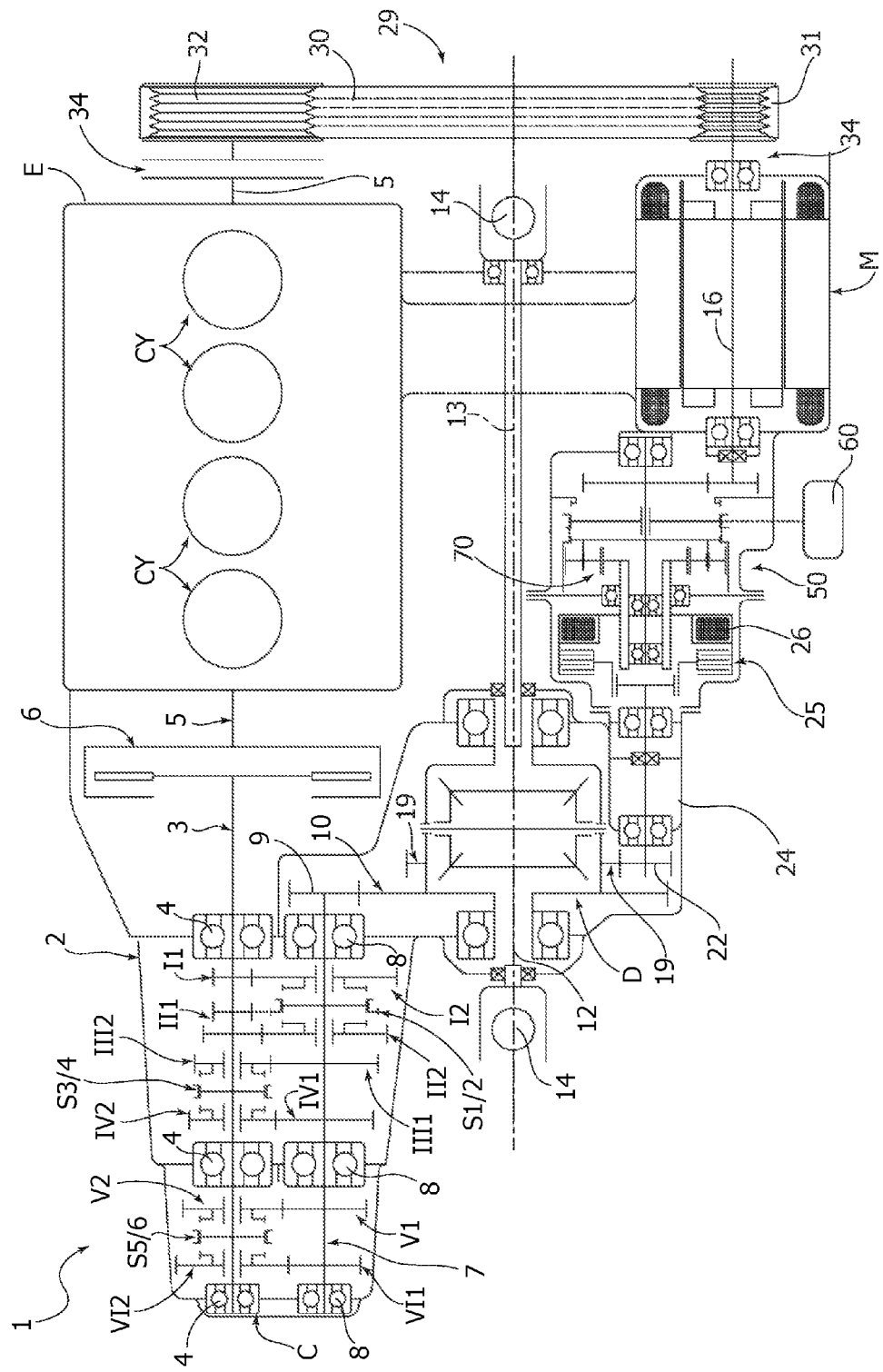
FIG. 5 is a schematic view of an embodiment of the powertrain unit according to the invention.

To come now to the embodiment of the invention illustrated in FIGS. 5-7, in this case the auxiliary shift device 50 comprises an epicyclic gear train 70. With reference in particular to any of FIGS. 6 and 7, the gear train 70 includes a sun gear 71, an outer ring gear 72, a plurality of planet gears 73 meshing around the sun gear 71 and within the outer ring gear 72, and a planet carrier 74 carrying the planet gears 73 and carried by a shaft 75 supported in a rotatable way by rolling bearings 41. The shaft 75 is connected to the shaft 16 of the electric machine M. In the example illustrated, the shaft 75 is connected to the shaft 16 by means of a pair of gears 76, 77, carried, respectively, by the shafts 75, 16.

The sun gear 71 is connected in rotation to a hollow shaft 78, in turn connected to the crown wheel 19 of the differential D via the engagement device 25. The planet carrier 74 is instead connected, as already indicated, to the shaft 16 of the electric machine M via the shaft 75 and the pair of gears 76, 77.

The outer ring gear 72 is axially movable between a first operating position illustrated in FIG. 6, in which it is engaged on a toothing 74a of the planet carrier 74 so that it is connected in rotation with the planet carrier 74, and a second operating position, illustrated in FIG. 7, in which it is engaged on a toothing 50a carried by the casing of the device 50 so as to be blocked against rotation.

In the first position illustrated in FIG. 6, the gear train 70 provides a 1:1 transmission ratio. In the second position illustrated in FIG. 7, the gear train 70 provides a different transmission ratio (of reduction from the shaft 16 to the shaft 78).

The gear train 70 is provided with an actuator 60 of any one known type (illustrated only schematically in the drawings) for displacing selectively the outer ring gear 72 between its two operating positions. Preferably, the actuator 60 is an electromechanical actuator electronically controlled by the control unit of the motor vehicle on the basis of a pre-set program, as a function of the operating conditions of the vehicle, of the engine E, and of the electric machine M.

Naturally, without prejudice to the principle of the invention, the details of construction and the embodiments may vary widely with respect to what has been described and illustrated herein purely by way of example, without thereby departing from the scope of the present invention.

What is claimed is:

1. A hybrid powertrain unit for a motor vehicle, comprising:
   an internal-combustion engine; and
   a gearbox device including:
   at least one primary shaft, that can be connected to crankshaft of the internal-combustion engine by a clutch device,
   at least one secondary shaft, an axis of which is parallel to, and spaced apart from, an axis of said at least one primary shaft and which carries an output pinion;
   a plurality of pairs of gears corresponding to a plurality of forward gear ratios, in which one of the gears of each pair of the plurality of pairs of gears is rigidly connected in rotation with respect to one of said at least one primary and secondary shafts and the other is freely rotatable with respect to the other of said at least one primary and secondary shafts; and
   a plurality of gear-selection devices for coupling in rotation each of said freely rotatable gears with the shaft on which it is mounted;
   a differential, having a first crown wheel meshing with said output pinion of said at least one secondary shaft of the gearbox device;
   an electric machine adapted to operate both as an electric motor and as an electric generator and having a casing rigidly connected to a supporting structure of said powertrain unit, and a shaft connected by a connecting transmission to a second crown wheel of said differential;
   an engagement device arranged, in said connecting transmission, between the shaft of the electric machine and the second crown wheel of the differential; and
   an actuator arrangement for actuating said engagement device,
   wherein said connecting transmission includes an auxiliary shift device configured for providing at least two different selectable transmission ratios, and said auxiliary shift device comprises an epicyclic gear train, including:
   a sun gear, an outer ring gear, a plurality of planet gears meshing around the sun gear and within the outer ring gear, and a planet carrier carrying the plurality of planet gears,
   said sun gear being connectable in rotation with said second crown wheel of the differential,
   said planet carrier being connected to the shaft of said electric machine, and
   said outer ring gear being axially movable between a first operating position in which it is connected in rotation with the planet carrier and a second operating position in which it is blocked on supporting structure of the powertrain unit; and
   a device for selection of a transmission ratio for displacing selectively the outer ring gear between its two operating positions.

2. The unit according to claim 1, wherein said auxiliary shift device is set between said engagement device and the shaft of the electric machine.

3. The unit according to claim 1, wherein said auxiliary shift device is provided with an electronically controlled actuator for selection of the transmission ratio.

4. The unit according to claim 1, wherein said planet carrier is connected to the shaft of the electric machine via a pair of gears.

5. The unit according to claim 1, wherein the shaft of the electric machine is connected to the crankshaft of the internal-combustion engine at an end thereof opposite to an end connected to the gearbox device.

6. The unit according to claim 5, wherein the shaft of the electric machine is connected to the crankshaft by a belt transmission including an endless belt engaged on a first pulley connected to the shaft of the electric machine and on a second pulley connected to the crankshaft of the internal-combustion engine.

7. The unit according to claim 6, wherein set between one of said first and second pulleys of said belt transmission is a further engagement device.

8. The unit according to claim 6, wherein said belt transmission that connects the shaft of the electric machine to the crankshaft of the internal-combustion engine also controls one or more auxiliary devices of the motor vehicle, the one or more auxiliary devices including one or more of a compressor of an air-conditioning system and a source of negative pressure for a braking system.

9. The unit according to claim 1, wherein the shaft of the electric machine has an axis parallel to, and spaced apart from, axes of two output shafts of the differential.

10. The unit according to claim 1, wherein said engagement device is a clutch engagement device and the actuator arrangement comprises an electromagnetic or electrohydraulic actuator and an electronic unit for controlling said actuator.

* * * * *